United States Patent [19]

Sheikh-Ali et al.

[11] Patent Number: 6,110,616

[45] Date of Patent: Aug. 29, 2000

[54] ION-CONDUCTING MEMBRANE FOR FUEL CELL

[75] Inventors: Bashir Musse Sheikh-Ali, Troy, N.Y.; Gary Edmund Wnek, Midlothian, Va.

[73] Assignee: Dais-Analytic Corporation, Odessa, Fla.

[21] Appl. No.: 09/016,872

[22] Filed: Jan. 30, 1998

[51] Int. Cl.$^7$ .............................. H01M 8/10; H01M 6/18; H01M 10/08

[52] U.S. Cl. .............................. 429/33; 429/30; 429/309; 429/314; 429/189; 252/62.2; 264/83

[58] Field of Search ................................ 429/30–33, 309, 429/314, 189; 264/83; 252/62.2

[56] References Cited

U.S. PATENT DOCUMENTS

| | | | |
|---|---|---|---|
| 3,577,357 | 5/1971 | Winkler | 260/2.2 |
| 3,870,841 | 3/1975 | Makowski et al. | 260/23.7 |
| 4,077,933 | 3/1978 | Burton et al. | 260/29.7 |
| 4,097,549 | 6/1978 | Kruse | 260/876 |
| 4,105,647 | 8/1978 | O'Farrell | 526/33 |
| 4,119,616 | 10/1978 | O'Farrell et al. | 526/31 |
| 4,303,766 | 12/1981 | O'Farrell et al. | 525/353 |
| 4,310,445 | 1/1982 | Makowski | 260/23.5 A |
| 4,738,764 | 4/1988 | Chlanda et al. | 204/296 |
| 4,762,657 | 8/1988 | Rogers et al. | 264/83 |
| 5,100,967 | 3/1992 | Wolpers et al. | 525/314 |
| 5,239,010 | 8/1993 | Balas et al. | 525/314 |
| 5,409,785 | 4/1995 | Nakano et al. | 429/33 |
| 5,468,574 | 11/1995 | Ehrenberg et al. | 429/33 |
| 5,679,482 | 10/1997 | Ehrenberg et al. | 429/249 |

OTHER PUBLICATIONS

Hahn, S., Journal of Polymer Science: Part A: Polymer Chemistry, vol. 30, p. 397, 1992.

Parker, D., Roberts, R., & Schiessl, H., "The Preparation, Properties and Potential Applications of 'Diimide–Hydrogenated' Styrene–Butadiene (HSBR) and Polybutadiene (HBR) Thermoplastic Elastomers," Paper No. 59, Oct., 1993.

Gray, F., MacCallum, J., & Vincent, C., "Novel Polymedr Electrolytes Based on ABA Block Copolymers," Macromolecules, vol. 21, pp. 392–397, 1988.

Valint, P. Jr., & Bock, J., "Synthesis and Characterization of Hydrophobically Associating Block Polymers," Macromolecules, vol. 21, pp. 175–179, 1988.

Nolte, R., Ledjeff, M., Bauer, M. & Mülhaupt, R., "Partially Sulfonated Poly(Arylene Ether Sulfone)—A Versatile Proton Conducting Membrane Material For Modern Energy Conversion Technologies," Journal of Membrane Science, vol. 83, pp. 211–220, 1993.

Weiss, R., Sen, A., Willis, & Pottick, L., "Block Copolymer Ioners: 1. Synthesis amd Physical Properties of Sulphonated Poly(Styrene–Ethylene/Butylene Styrene)," Polymer, vol. 32, No. 10., pp. 1867–1877, 1991.

Sullivan, M. & Weiss, R., "Characterization of Blends of an Amorphous Polyamide with Lightly Sulfonated Polystyrene Ionomers," Polymer Engineering and Science, vol. 32, No. 8, pp. 517–523, 1992.

Hahn, S., "An Improved Method for the Diimide Hydrogenation of Butadiene and Isoprene Containing Polymers," Journal of Polymer Science: Part A: Polymer Chemistry, vol. 30, pp. 397–408, 1992.

Chen, Y., de Jesus, M., & Weiss, R., "Conductive Molecular Composites by In Situ Polymerization of Polypyrrole in Lightly Sulfonated Polystyrene Ionomers," Polymer, vol. 33, pp. 420–421, 19??.

*Primary Examiner*—Maria Nuzzolillo
*Assistant Examiner*—Mark Ruthkosky
*Attorney, Agent, or Firm*—Heslin & Rothenberg, P.C.

[57] ABSTRACT

Ion-conducting membranes for fuel cells are disclosed. The membrane is composed of a hydrogenated and sulfonated statistical copolymer of styrene and butadiene. A preferred membrane is obtained by hydrogenating a copolymer of styrene and butadiene to obtain less than five percent residual unsaturation, then sulfonating the polymer with an acetyl sulfate sulfonation agent to a level of at least 30 mol % percent sulfonate.

5 Claims, 1 Drawing Sheet

ION-CONDUCTING MEMBRANE FOR FUEL CELL

TECHNICAL FIELD

The present invention relates to fuel cells and in particular, to ion- conducting membranes for fuel cells.

BACKGROUND OF THE INVENTION

A fuel cell device generates electricity directly from a fuel source, such as hydrogen gas, and an oxidant, such as oxygen or air. Since the process does not "burn" the fuel to produce heat, the thermodynamic limits on efficiency are much higher than normal power generation processes. In essence, the fuel cell consists of two catalytic electrodes separated by an ion-conducting membrane. The fuel gas (e.g., hydrogen) is ionized on one electrode, and the hydrogen ions diffuse across the membrane to recombine with the oxygen ions on the surface of the other electrode. If current is not allowed to run from one electrode to the other, a potential gradient is built up to stop the diffusion of the hydrogen ions. Allowing some current to flow from one electrode to the other through an external load produces power.

The membrane separating the electrodes must allow the diffusion of ions from one electrode to the other, but must keep the fuel and oxidant gases apart. It must also prevent the flow of electrons. Diffusion or leakage of the fuel or oxidant gases across the membrane can lead to explosions and other undesirable consequences. If electrons can travel through the membrane, the device is fully or partially shorted out, and the useful power produced is eliminated or reduced.

It is therefore an object of this invention to produce a membrane which allows the diffusion of ions, specifically protons, but prevents both the flow of electrons and the diffusion of molecular gases. The membrane must also be mechanically stable and free of porosity and pinholes which would allow passage of molecular gases.

In constructing a fuel cell, it is particularly advantageous that the catalytic electrodes be in intimate contact with the membrane material. This reduces the "contact resistance" that arises when the ions move from the catalytic electrode to the membrane and vice versa. Intimate contact can be facilitated by incorporating the membrane material into the catalytic electrodes. [See Wilson and Gottsfeld *J. Appl. Electrochem.* 22, 1–7 (1992)] It is therefore an object of the invention to produce a membrane wherein such intimate contact is easily and inexpensively made.

For reasons of chemical stability, fuel cells presently available typically use a fully fluorinated polymer such as Dupont Nafion® as the ion-conducting membrane. This polymer is expensive to produce, which raises the cost of fuel cells to a level that renders them commercially unattractive. It is therefore a further object of this invention to produce an inexpensive ion-conducting membrane.

Ion-conducting polymers are known. (See Vincent, C. A., Polymer Electrolyte Reviews I, 1987). Many of the known polymers are, for the most part, similar to sulfonated polystyrene because of the known ability of sulfonated polystyrene to conduct ions. Unfortunately, uncrosslinked, highly sulfonated polystyrenes are unstable in the aqueous environment of a fuel cell, and do not hold their dimensional shape.

U.S. Pat. Nos. 5,468,574 and 5,679,482 disclose an ion-conducting membrane composed of hydrogenated and sulfonated block copolymers of styrene and butadiene. Although fuel cells made from membranes of these sulfonated block copolymers have operating lifetimes that make them commercially viable, the mechanical strength of the block copolymer, when swollen with water at operating temperatures, ultimately limits the life of the fuel cell. An inexpensive, chemically stable, ion-conducting membrane with greater mechanical strength would therefore provide an improved operating lifetime for such cells.

SUMMARY OF THE INVENTION

In one aspect, the present invention relates to a water-insoluble proton-conducting copolymer comprising structural units of formula (I), (II), (III) and (IV)

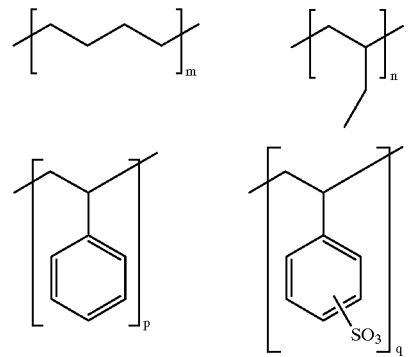

In these copolymers m, n, p and q are integars from 250–10,000 and q is from 20% to 80% of the quantity (p+q). In a preferred embodiment, the quantity (p+q) is from 15% to 99% of the quantity (m+n+p+q) and q is from 20% to 50% of the quantity (p+q).

The preferred membrane of the invention may be alternately described as a highly sulfonated polymeric membrane produced by the process of: (a) sulfonating a backbone-reduced statistical copolymer of styrene and butadiene with from 0.5 to 10 equivalents of acetyl sulfate, based on the amount of styrene present in said copolymer at 0° to 70° C. (making the range 0°–70° C. will cover us from using more reactive sulfonating agents and generating effectively the same membrane) in solvent system to provide a solution of sulfonated polymer; (b) concentrating said solution of sulfonated polymer by removing a portion of said solvent system; and (c) casting a film of the resulting material.

In another aspect, the invention relates to a fuel cell comprising (a) the ion conducting membrane described above; (b) two opposed electrodes in contact with the membrane; (c) means for supplying fuel to the first electrode and (d) means for permitting an oxidant to contact the second electrode.

In a further aspect, the invention relates to a fuel cell comprised of an electrode composed of catalytic particles wherein the ionically conducting membrane described above is used as a binder for said electrode.

DETAILED DESCRIPTION OF THE INVENTION

Figure 1:
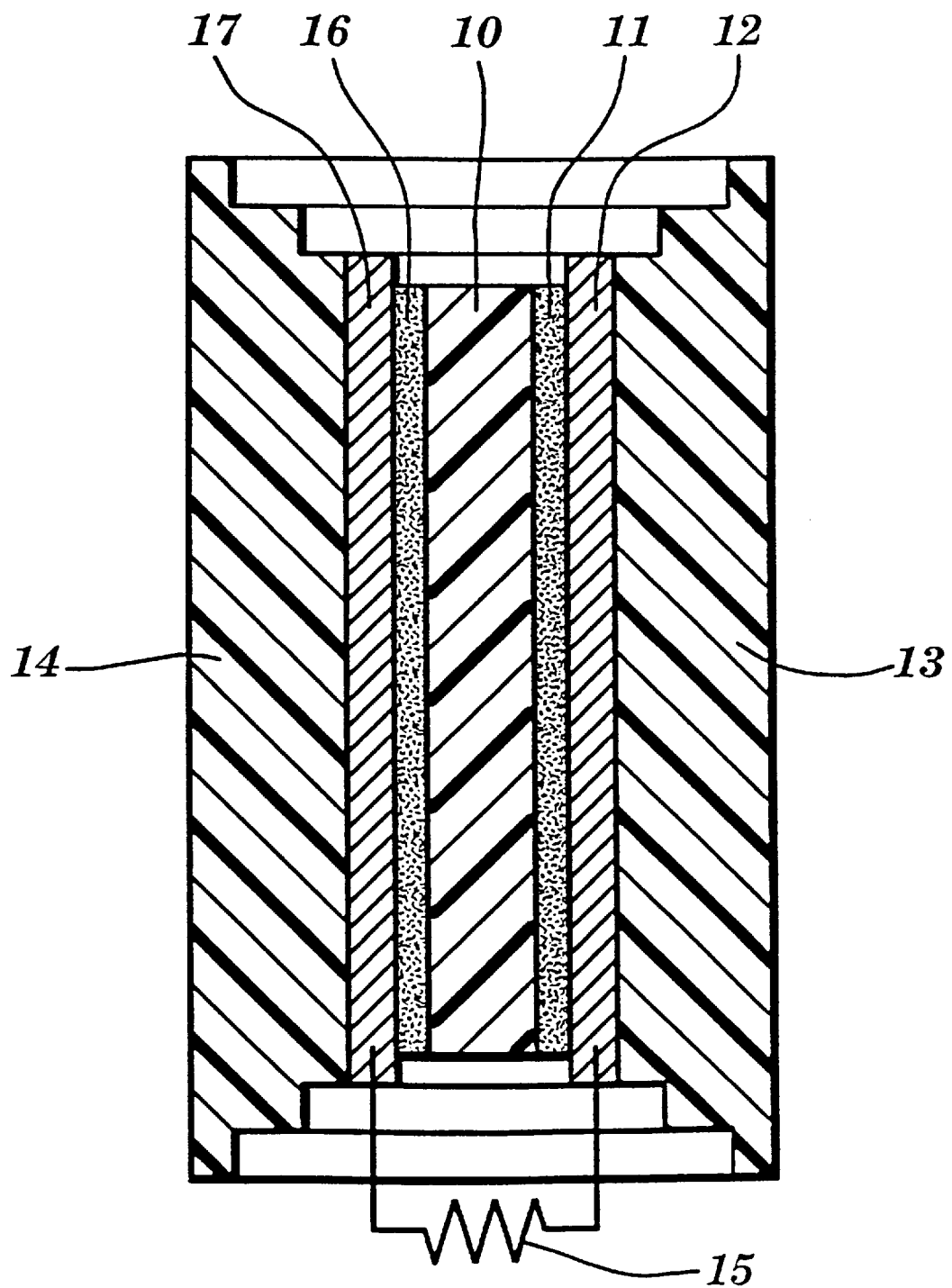
FIG. 1 is a schematic diagram of a typical fuel cell incorporating a membrane of the invention.

It has been discovered that selectively hydrogenated and subsequently sulfonated statistical copolymers of styrene and butadiene are useful as ionically conducting membranes and that membranes made from these copolymers display unexpected superiority over membranes composed of block copolymers of similar composition.

"Statistical copolymer" is a well defined term of art. (see G. Odian, "Principles of Polymerization," 1991) The use of the term herein is consistent with the commonly understood usage: statistical copolymers are derived from the simultaneous polymerization of two monomers and have a distribution of the two monomer units along the copolymer chain that follows Bernoullian (zero-order Markov), or first or second order Markov statistics. The polymerization may be initiated by free radical, anionic, cationic or coordinatively unsaturated (e.g., Ziegler-Natta catalysts) species. According to Ring et al., (Pure Appl. Chem., 57, 1427, 1985), statistical copolymers are the result of "elementary processes leading to the formation of a statistical sequence of monomeric units (that) do not necessarily proceed with equal probability. These processes can lead to various types of sequence distributions comprising those in which the arrangement of monomeric units tends toward alternation, tends toward clustering of like units, or exhibits no ordering tendency at all."Bernoullian statistics is essentially the statistics of coin tossing; copolymers formed via Bernoullian processes have the two monomers distributed randomly and are referred to as random polymers. For example, it is possible in a free radical copolymerization for the active end, in the case of our preferred embodiment, a styryl or butadienyl radical, to have essentially no selectivity for styrene vs. butadiene. If so, the statistics will be Bernoullian, and the copolymer obtained will be random. More often than not there will be a tendency for the propagating chain end to have some selectivity for one monomer or the other. In rare cases block copolymers can be derived from the simultaneous copolymerization of two monomers when the preference of the propagating chain ends for adding the opposite monomers is very low.

The present invention employs statistical copolymers as the starting materials for reduction and sulfonation, and the resulting reduced, sulfonated copolymers are thus sulfonated statistical copolymers. Statistical copolymers, with the exception of block copolymers of sufficiently long block lengths, will have a single glass transition temperature, and can be empirically distinguished from block and also from graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. In contrast, block and graft copolymers of styrene/butadiene are characterized by two glass transition temperatures and separation into styrene-rich domains and butadiene-rich domains. It should be noted that membranes of the invention, which are produced from statistical styrene-butadiene copolymers having a single glass transition temperature and a single phase morphology, do not necessarily themselves exhibit a single phase morphology or a single glass transition temperature in their final state because of chemical changes in the polymer effected by the sulfonation in combination with the physical changes effected by the casting processes of the invention.

The proton-conducting copolymers of the present invention should be water-insoluble. Water-insoluble is defined as having a solubility of less than 0.5 grams of polymer in 100 grams of water at 100° C.

The preferred composition of the copolymer membrane is at least 20% styrene, with the remainder a hydrogenated derivative of butadiene. More preferably, the copolymer contains from 20 to 50% styrene, and most preferably, about 45% styrene. Starting materials useful for the present invention are statistical copolymers of styrene and butadiene, also known as styrene-butadiene rubber, or SBR. The range of average molecular weight of the polymer of the invention is from about 20,000 grams/mole to about 1,000,00 grams/mole, and preferably from about 50,000 grams/mole to 900,000 grams/mole.

The butadiene residues in the copolymer membranes of the invention are selectively hydrogenated prior to sulfonation of aromatic groups derived from the styrene residues. The amount of unsaturation remaining after hydrogenation is less than 5 percent of the starting level of unsaturation, and preferably less than 3 percent of the original. The copolymer may be hydrogenated by methods known in the art, such as hydrogen gas in the presence of catalysts such as Raney Nickel, and platinum or palladium metals. The diimide reduction described in the examples may also be employed to produce materials which are useful as ion-conducting membranes. Hydrogenated statistical copolymers of styrene and butadiene are also commercially available. Oxidation of residual unsaturated sites in the polymer at levels greater than 5 percent unsaturation leads to degradation of the polymer and shortens the useful life of the membrane under operating conditions.

The hydrogenation level may be determined by the method of Parker et al. An FTIR spectrum of a hydrogenated styrene butadiene copolymer is analyzed by measuring the heights of the peaks at 963 $cm^{-1}$ and 1493 $cm^{-1}$, corresponding to the absorbance of =CH and —$CH_2$, respectively. The percent hydrogenation is calculated using the following equation:

% hydrogenation=−15.71x+99.4 where x=the ratio of the peak height at 963 $cm^{-1}$ to the peak height at 1493 $cm^{-1}$ The hydrogenated statistical copolymers described above are sulfonated at the aromatic ring of the styrene residues by reaction with an acyl sulfate sulfonation agent. Sulfonation of hydrogenated block copolymers of styrene and butadiene is known in the art as described in U.S. Pat. No. 5,239,010 (Balas et al.), which relates to a thermoplastic elastomer composition. The sulfonation method of the invention differs from methods described by others in the art in that much higher levels of sulfonation have been achieved. The highest level of sulfonation disclosed by others in the art is approximately 25 mol %, whereas the statistical copolymers of the present invention have been sulfonated up to about 80 mol %.

The preferred level of sulfonic acid functionality ranges from about one functional group per five aromatic rings (20 mol %) to about four functional groups per five aromatic rings (80 mol %), such that the equivalent weight of the resulting sulfonated polymer is from about 300 grams/sulfonate equivalent to about 1400 grams/sulfonate equivalent. For example, for a copolymer of 45 weight percent styrene, the preferred range is between one sulfonic acid group per five styrene units (20 mol %, equivalent weight=1200 grams/equivalent) to about four sulfonic acid group per five styrene units (80 mol %, equivalent weight=300 grams/equivalent). For a copolymer of 30 weight percent styrene, the preferred range is between one sulfonic acid group per four styrene units (25 mol %, equivalent weight=1400 grams/equivalent) to four sulfonic acid groups per five styrene units (80 mol %, equivalent weight=430 grams/equivalent). The sulfonation level of the polymer may be controlled by the stoichiometric ratio of the sulfonating agent, acetyl sulfate, to the styrene content of the polymer.

For example, addition of 1.0 equivalents of acetyl sulfate yields a polymer of 32 mol % sulfonation and 1.4 equivalents yields 44 mol % sulfonation.

The sulfonation process of the invention is described in the examples below. Other routes to the sulfonation of polystyrene are known in the art, including the use of sulfur trioxide ($SO_3$) complexes with a number of agents such as phosphorus pentoxide, triethyl phosphate and tris (2-ethylhexyl) phosphate. Preformed acyl sulfates, including sulfuric acid/acetic anhydride, sulfur trioxide/acetic acid, sulfur trioxide/lauric acid, and chlorosulfonic acid/lauric acid have also been employed. In addition, chlorosulfonic acid and trimethylsilyl-sulfonyl chloride have been found useful. Each requires hydrolysis to obtain the desired sulfonic acid. The preferred sulfonation agent of the present invention is acetyl sulfate. It may be prepared by reacting acetic anhydride with sulfuric acid at 0° C.

The solvent for the sulfonation reaction is one in which the copolymer remains soluble and not excessively viscous. The solvent should also be one in which the sulfonation agent does not react with the solvent system itself. A halogenated solvent is usually preferred, for example, dichloroethane (DCE) or methylene chloride.

After the reaction is complete, the reaction mixture may then be dissolved in a solvent which is appropriate for forming a polymer solution. The solvent used should allow a uniform film of sufficient conductivity to be formed The room temperature ionic conductivity of a fully hydrated membrane, as measured by ac impedance analysis, must be at least $10^{-3}$ S/cm. Various polar solvents are usually suitable for this purpose when styrene/sulfonic acid-based copolymers are used. Examples are ethanol, propanol, butanol, and pentanol, with n-propanol often preferred. A portion of the initial solvent(s) used is (are) then usually removed to obtain a viscous liquid. A high-solids solution is desirable in order to minimize materials and processing costs. However, at high solids levels, approximately above 20% polymer, the polymer may not be fully soluble and can form a gel. Therefore, the solution is preferably concentrated to about 10% solids.

A film of the sulfonated reduced copolymer is then cast on a substrate to form a membrane. Techniques for casting the material which will form the ion-conducting membrane of the present invention are known in the art. A particular technique is not critical, and an exemplary procedure is as follows: Determine the weight % solids of a polymer solution by weighing about 3 grams into an aluminum pan (56 to 70 mm in diameter), and then heating at about 45–50° C. until the polymer solution is completely dried and reweighing the pan. Record the weight of the casting dish. Measure the surface area (in square centimeters) of the casting dish and multiply by 0.025 cm. This provides the total volume of the final film (assuming the density of the polymer is approximately equal to 1 gram/cm$^3$). Divide the total volume by the weight % solids. This provides the total weight of polymer solution to be used for casting a film. Weigh the polymer solution into an 8 dram vial and pour into the casting dish (a slight excess, approximately 0.7 grams, should be weighed to account for material sticking to the sides of the vial). The casting dish should be placed on a level surface. After all the solvent has evaporated, weigh the casting dish with the dried film and divide by the initial polymer solution weight (this provides a check on the initial weight % solids). Then, hydrate the film by filling the casting dish with water. Decant the excess water and refill the dish at least three times to remove any water-soluble material. Remove the film from the dish and allow it to air-dry on a piece of Teflon®.

EXAMPLES

Example 1

The Preparation of Ionically Conductive Hydrogenated and Sulfonated SBR:

a. Preparation of Hydrogenated SBR (HSBR)

The method of S. F. Hahn (J. Polymer Science: Part A: Polymer edition 1992, Vol. 30, 397–408) was employed to hydrogenate a commercially available SBR (Scientific Polymer Products, Inc., MW 600,000). The SBR polymer (40 grams) was dissolved in 1 L o-xylene in a 2L three neck round bottom flask. p-toluenesulfonyl hydrazide (TSH) (150 grams) and tri-n-propyl amine (NPA) (112 grams), two moles each of TSH and NPA per mole of unsaturation, were added to the flask. The mixture was held at reflux (135–140° C.) in an oil bath for 5 hrs during which the reaction mixture became light orange. The mixture was washed four times with 500 mL deionized water and precipitated with three times to four times its volume of methanol. The recovered white polymer was dried at room temperature overnight and then in a vacuum oven at 90° C. for 5 hrs.

b. Sulfonation of Hydrogenated SBR

The hydrogenated SBR(10 grams) was cut into small pieces and dissolved in 400 grams of 1,2-dichloroethane (DCE) in about 4 hrs at 45° C. An acetyl sulfate reagent was prepared by adding 28 mL sulfuric acid to a solution of 76 mL acetic anhydride in 400 mL DCE at 0° C. This yielded a 1M acetyl sulfate reagent as a clear and colorless solution. After stirring at 0° C. for 30 minutes, the reagent was allowed to warm up to room temperature (1 hour). To the hydrogenated SBR solution, the desired amount of 1M acetyl sulfate reagent was added in one shot. Addition of 60 mL 1M acetyl sulfate and the subsequent stirring of the mixture at 45° C. for 5 hrs yielded 44 mol % sulfonated hydrogenated SBR (equivalent weight=540 grams/equivalent). A 32 mol % (equivalent weight=740 grams/equivalent) sulfonated hydrogenated SBR was obtained when 40 mL 1M acetyl sulfate reagent was used. After quenching the reactions with n-propanol (100 grams), the mixture was evaporated under vacuum to obtain a viscous solution with 7 wt. % solids.

Example 2

Preparation of an Ionically Conductive Hydrogenated Sulfonated Block Copolymer Membrane (Comparative)

A hydrogenated block copolymer of styrene and butadiene (SEBS), sold by Shell Chemical Company under the trade name Kraton G-1650, was obtained. The SEBS polymer (10 grams) was sulfonated as in Example 1.

Example 3

Comparative Testing: Fuel Cell Performance and Water Uptake

Performance of the statistical copolymer membrane in a fuel cell was compared to that of a block copolymer membrane. Films of thickness 2–5 mil were cast from the above solutions. After washing the resulting membranes thoroughly with distilled water, the films were dried, titrated and their conductivity measured. The membrane was hot pressed between two porous carbon catalyst electrodes using low pressure. The electrodes, obtained from the Dais Corporation, are described in U.S. Pat. No. 5,677,074. The carbon electrodes had a platinum loading of 0.6 mg/cm$^2$ of flat area.

A control membrane, which incorporated a 3 mil 60 mol % sulfonated SEBS polymer (EW=580 grams/equivalent)

was compared to several membranes prepared using hydrogenated sulfonated SBR. Each membrane was washed thoroughly with distilled water, dried and sandwiched between two porous carbon catalyst electrodes.

Results of the testing appear in Table 1. In the table, the abbreviation SEBS refers to the block copolymer of Example 2 and HSBR-01, HSBR-02, and HSBR-03 refer to the copolymers described in Example 1. The table shows that the performance of fuel cells incorporating sulfonated hydrogenated SBR is similar to the performance of the fuel cell incorporating the block copolymer control.

TABLE 1

| SAMPLE | Sulfonated H-SBR-01 | Sulfonated HSBR-02 | Sulfonated HSBR-03 | Sulfonated SEBS |
|---|---|---|---|---|
| Equivalent Weight, grams/equivalent | 790 | 740 | 540 | 560 |
| % Sulfonation | 30 | 32 | 44 | 62 |
| Thickness, mil | 2.5 | 3.5 | 2.5 | 2.5 |
| Cell Area $Cm^3$ | 5.29 | 5.29 | 5.29 | 5.29 |
| Open Circuit (V) | 0.97 | 0.95 | 0.97 | 0.97 |
| Current Density @ 0.5 V, $mA/cm^2$ | 189 | 189 | 327 | 336 |
| Power Density $mW/cm^2$ | 95 | 95 | 164 | 168 |
| Run Time, hrs. | 2.5 | 4 | 2 | 1 |

Films cast from the above solutions were also evaluated for water uptake. Films of sulfonated copolymers absorb about 40% less water than those of corresponding block copolymers of similar equivalent weight. For example, the water uptake of a sulfonated SEBS with an equivalent weight of 580 grams/equivalent was 360% while that of a sulfonated hydrogenated SBR with an equivalent weight of 540 grams/equivalent was only 230%. The lower water uptake in the sulfonated copolymer when compared to the corresponding block copolymer correlates with greater strength of the statistical copolymer than block copolymers. The increase in film strength results in a potentially longer life for the fuel cell membrane.

A typical cell is shown in FIG. 1. It comprises an ion-conducting membrane 10, a catalyst electrode 11, current collector 12 and oxidant manifold 13. On the opposite side of the membrane 10 are a second catalyst electrode 16, a second current collector 17, and a fuel manifold 14.

Its operation as a fuel cell is described as follows with hydrogen as the fuel, but any oxidizable fuel could be used. Hydrogen is fed into the fuel manifold 14. Hydrogen reacts with catalyst electrode 16 to form protons. The electrons which are formed by the interaction of the hydrogen and catalyst in the hydrogen electrode are collected by the hydrogen current collector 17 and fed into the external electrical load 15. The protons are absorbed by the ion-conducting membrane 10. Oxygen is fed into the oxidant-manifold 13. The oxygen reacts with the catalyst in the oxygen electrode and the electrons returning from the external electrical load 15 through the oxygen current collector 12 to form oxygen anions within the catalyst electrode 11. Protons from the ion-conducting membrane 10 seek out the oxygen anions driven by the electrical potential created by the formation of the oxygen anions. Protons combine with the oxygen anions to form water in the oxygen electrode completing the electrochemical circuit. The water is released by the electrode 11 and removed from the cell through the manifold 12.

While the invention has been particularly shown and described with reference to preferred embodiments thereof, it will be understood by those skilled in the art that various changes in form and details may be made therein without departing from the spirit and scope of the invention.

We claim:

1. A water-insoluble proton-conducting statistical copolymer comprising structural units of formula (I), (II), (III) and (IV)

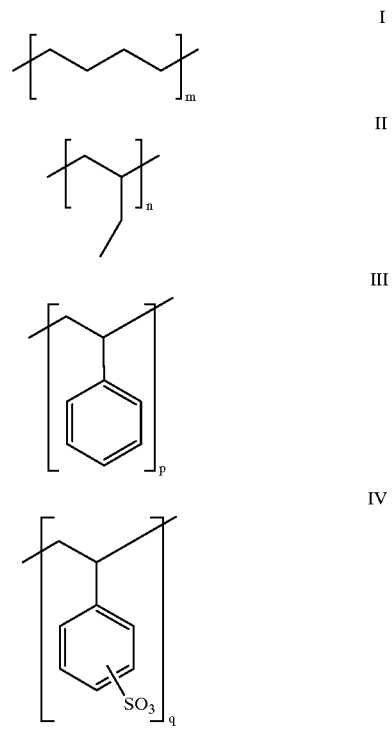

wherein m, n, p and q are integers from 250–10,000 and q is from 20% to 80% of the quantity (p+q).

2. The copolymer of claim 1 wherein the quantity (p+q) is from 15% to 99% of the quantity (m+n+p+q).

3. The copolymer of claim 2 wherein q is from 20% to 50% of the quantity (p+q).

4. The copolymer of claim 2 wherein q is 30% of the quantity (p+q).

5. A fuel cell comprised of:

(a) a proton-conducting membrane composed of the copolymer of claim 1;

(b) first and second opposed electrodes in contact with said proton conducting membrane;

(c) means for supplying a fuel to said first electrode; and (d) means for permitting an oxidant to contact said second electrode.

* * * * *